US012631140B1

(12) United States Patent
Ertas

(10) Patent No.: US 12,631,140 B1
(45) Date of Patent: May 19, 2026

(54) GEARBOX ASSEMBLY FOR A TURBINE ENGINE

(71) Applicant: General Electric Company, Evendale, OH (US)

(72) Inventor: Bugra H. Ertas, Niskayuna, NY (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/949,269

(22) Filed: Nov. 15, 2024

(51) Int. Cl.
| *F16H 57/08* | (2006.01) |
| *F02C 7/06* | (2006.01) |
| *F02C 7/36* | (2006.01) |
| *F16C 33/46* | (2006.01) |
| *F16H 1/28* | (2006.01) |

(52) U.S. Cl.
CPC ................. *F02C 7/06* (2013.01); *F02C 7/36* (2013.01); *F16H 1/28* (2013.01); *F16H 57/08* (2013.01); *F16C 33/4605* (2013.01); *F16H 2057/085* (2013.01)

(58) Field of Classification Search
CPC ... F16H 2057/085; F16C 33/4605; F02C 7/06
See application file for complete search history.

(56) References Cited

U.S. PATENT DOCUMENTS

| 3,008,559 | A | * | 11/1961 | Hans-Joachim | ...... | F16D 41/061 |
| | | | | | | 192/38 |
| 3,649,093 | A | * | 3/1972 | Muratore | ............ | F16C 33/3806 |
| | | | | | | 384/463 |
| 3,652,141 | A | * | 3/1972 | Husten | .................. | F16C 19/381 |
| | | | | | | 384/455 |
| 4,277,116 | A | * | 7/1981 | Lauterbach | ......... | F16C 33/3856 |
| | | | | | | 384/530 |
| 4,756,212 | A | | 7/1988 | Fuehrer | | |
| 8,777,802 | B2 | | 7/2014 | Erno et al. | | |
| 9,194,479 | B2 | | 11/2015 | Edelmann et al. | | |
| 10,030,708 | B2 | | 7/2018 | Nonato de Paula et al. | | |
| 10,138,940 | B2 | | 11/2018 | Nonato de Paula et al. | | |
| 10,385,961 | B2 | | 8/2019 | Dickman | | |

(Continued)

FOREIGN PATENT DOCUMENTS

| DE | 102005049185 A1 | * | 4/2007 | ............. | F03D 15/00 |
| DE | 102008032922 A1 | * | 1/2010 | ............ | F16C 23/086 |

(Continued)

*Primary Examiner* — Sherry L Estremsky
(74) *Attorney, Agent, or Firm* — Venable LLP; Michele V. Frank

(57) ABSTRACT

A gearbox assembly for a turbine engine, the gearbox assembly including a plurality of planet gears. Each of the plurality of planet gears is associated with a planet pin. A plurality planet bearing rollers are disposed between the planet pin and each of the plurality of planet gears. The plurality of planet bearing rollers are configured to transfer a rotation of each of the plurality of planet gears to the planet pin. A rolling element bearing (REB) cage is configured to guide and to position the plurality of planet bearing rollers so that the plurality of planet bearing rollers are equally spaced apart, the REB cage having an inner diameter surface facing the planet pin and an outer diameter surface facing opposite to planet pin. An outer diameter guide ring is disposed radially outward of the outer diameter surface to hold the REB cage.

20 Claims, 9 Drawing Sheets

(56)           References Cited

U.S. PATENT DOCUMENTS

| | | | |
|---|---|---|---|
| 10,641,332 B2 * | 5/2020 | Nonato de Paula | .. F04D 29/056 |
| 11,131,249 B2 * | 9/2021 | Di Giovanni | ......... F16C 37/007 |
| 11,193,557 B2 | 12/2021 | Hrubec | |
| 11,572,944 B1 | 2/2023 | Kirov et al. | |
| 2005/0148425 A1 * | 7/2005 | Nakagawa | .............. F16C 19/28 |
| | | | 475/348 |
| 2017/0089218 A1 * | 3/2017 | Hasting | ................... F16H 57/08 |
| 2024/0280170 A1 * | 8/2024 | Gravina | .............. F16H 57/0424 |

FOREIGN PATENT DOCUMENTS

| | | | | | |
|---|---|---|---|---|---|
| DE | 102011085236 A1 | * | 5/2013 | .......... | F16C 33/4605 |
| FR | 2539829 A1 | * | 7/1984 | ........... | F16C 23/086 |
| FR | 3127024 A1 | | 3/2023 | | |
| FR | 3127025 A1 | | 3/2023 | | |
| FR | 3129436 A1 | | 5/2023 | | |
| FR | 3129690 A1 | | 6/2023 | | |
| FR | 3130747 A1 | | 6/2023 | | |
| FR | 3130875 A1 | | 6/2023 | | |
| GB | 2535622 A | * | 8/2016 | ........... | F16C 19/522 |
| JP | 2008185175 A | * | 8/2008 | ........... | F16C 33/543 |
| JP | 2008196589 A | * | 8/2008 | .............. | F16C 33/48 |
| JP | 2010255778 A | * | 11/2010 | ......... | F16C 33/4605 |
| JP | 2011174554 A | * | 9/2011 | .......... | F16C 33/4605 |

* cited by examiner

GEARBOX ASSEMBLY FOR A TURBINE ENGINE

TECHNICAL FIELD

The present disclosure relates generally to gearbox assemblies for engines, such as turbine engines.

BACKGROUND

Turbine engines generally include a fan and a turbomachine arranged in flow communication with one another. The turbine engines may include one or more gearbox assemblies, and a lubrication system for providing lubricant to one or more components of the one or more gearbox assemblies.

BRIEF DESCRIPTION OF THE DRAWINGS

Features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Figure 1:
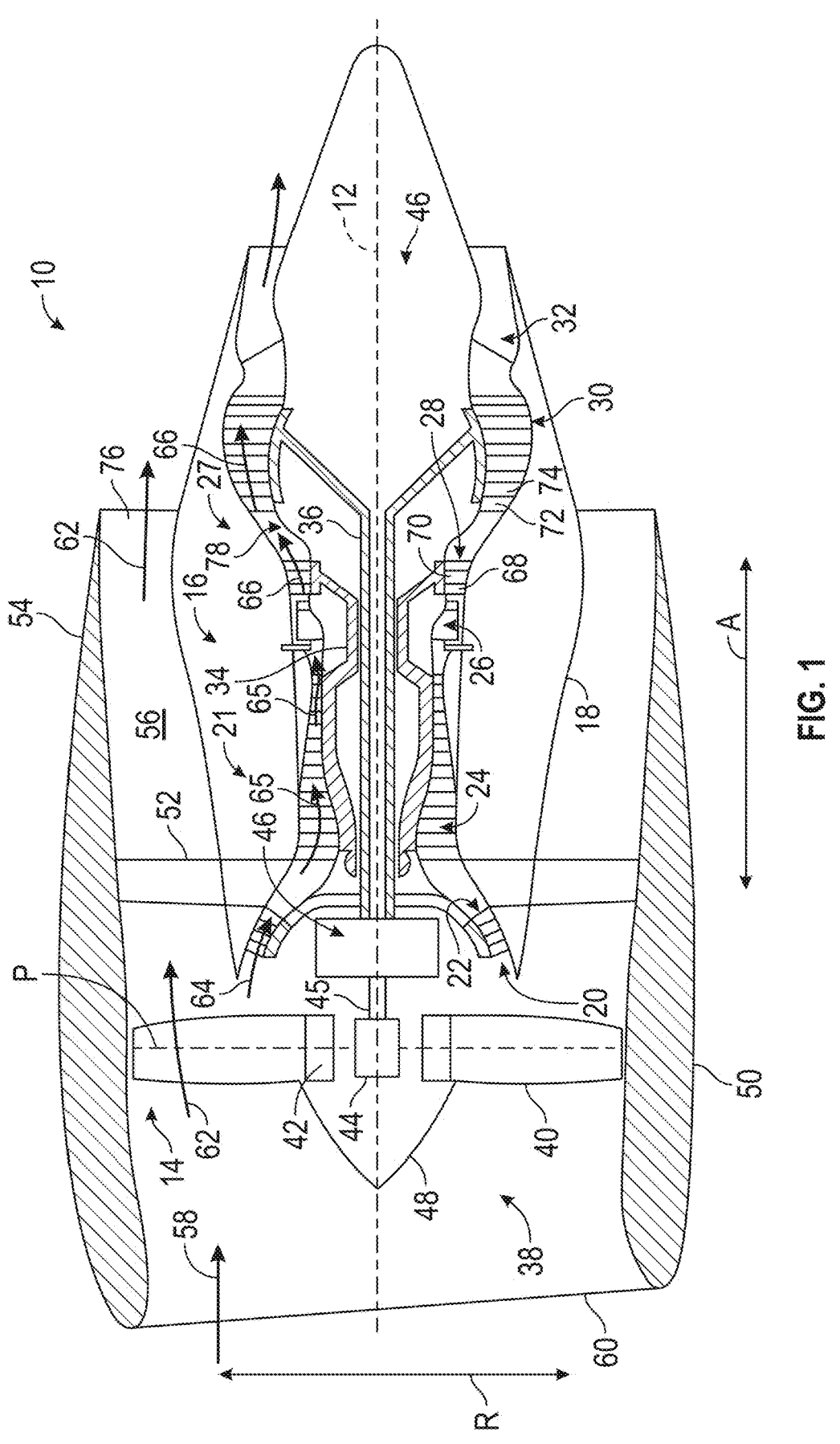
FIG. 1 is a schematic, cross-sectional diagram of a turbine engine, taken along a longitudinal centerline axis of the turbine engine, according to an embodiment of the present disclosure.

Features, advantages, and embodiments of the present disclosure are set forth or apparent from a consideration of the following detailed description, drawings, and claims.

Moreover, both the foregoing summary of the present disclosure and the following detailed description are exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the present disclosure.

As used herein, the terms "first" and "second" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "low" and "high," or their respective comparative degrees (e.g., "lower" and "higher," where applicable), when used with the compressor, turbine, shaft, or spool components, each refers to relative pressures and/or relative speeds within an engine unless otherwise specified. For example, a "low-speed" component defines a component configured to operate at a rotational speed, such as a maximum allowable rotational speed, which is lower than that of a "high-speed" component of the engine. Alternatively, unless otherwise specified, the aforementioned terms may be understood in their superlative degree. For example, a "low-pressure turbine" may refer to the lowest maximum pressure within a turbine section, and a "high-pressure turbine" may refer to the highest maximum pressure within the turbine section. The terms "low" or "high" in such aforementioned regards may additionally, or alternatively, be understood as relative to minimum allowable speeds and/or pressures, or minimum or maximum allowable speeds and/or pressures relative to normal, desired, steady state, etc., operation of the engine.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the term "axial" refers to directions and orientations that extend substantially parallel to a longitudinal centerline of the turbine engine. Moreover, the terms "radial" and "radially" refer to directions and orientations that extend substantially perpendicular to the longitudinal centerline of the turbine engine. In addition, as used herein, the term "circumferentially" refers to directions and orientations that extend arcuately about the longitudinal centerline of the turbine engine.

The present disclosure provides a planet gear rolling element bearing (REB) cage design within an epicyclic planetary gearbox designed to support high G loads. Conventional gearbox designs, which utilize a planetary configuration (rotating carrier), typically incorporate journal bearings due to the limitations of REB cages. In a planetary configuration, the planet gear and planet bearing subassemblies are subjected to centrifugal loading due to the rotating carrier. The rotating carrier forces the planet gear-bearing subassembly to orbit about the engine centerline. In this scenario, the REB cage is forced out radially and creates a single load carrying interface between the REB cage bore inner diameter (ID) and the pin shoulder. For high-G loads this interface surface is inadequate for sustaining centrifugal high-G loading. The term "High G loads" is used herein for planetary applications on orbiting bearing systems and can vary between four hundred (400) Gs to five thousand (5,000) Gs depending on drivetrain parameters such as input speed, gear ratio, and torque density. The symbol "G" refers to the gravitation constant of the earth.

An aspect of the present disclosure is to provide a high-G load REB in planetary configurations by implementing two elements. First, the planet bearing design incorporates support pin shoulders and guide rings to create an additional load carrying surface on the outer diameter (OD) surface of the REB cage in addition to the inner diameter (ID) bore. This provides for twice the G-loading capability. Second, additive manufacturing methods can be used for creating lightweight lattice structures in the REB cage, hence, further reducing G load and increasing the orbiting speed capability of the bearing system.

Referring now to the drawings, FIG. 1 is a schematic cross-sectional diagram of a turbine engine 10, taken along a longitudinal centerline axis 12 of the turbine engine 10, according to an embodiment of the present disclosure. As shown in FIG. 1, the turbine engine 10 defines an axial direction A (extending parallel to the longitudinal centerline axis 12 provided for reference) and a radial direction R that is normal to the axial direction A. In general, the turbine engine 10 includes a fan section 14 and a turbo-engine 16 disposed downstream from the fan section 14.

The turbo-engine 16, depicted in FIG. 1, generally includes an outer casing 18 that is substantially tubular and defines an annular inlet 20. As schematically shown in FIG. 1, the outer casing 18 encases, in serial flow relationship, a compressor section 21 including a booster or a low-pressure (LP) compressor 22 followed downstream by a high-pressure (HP) compressor 24, a combustion section 26, a turbine section 27 including a high-pressure (HP) turbine 28 followed downstream by a low-pressure (LP) turbine 30, and a jet exhaust nozzle section 32. A high-pressure (HP) shaft 34 or a spool drivingly connects the HP turbine 28 to the HP compressor 24, to rotate the HP turbine 28 and the HP compressor 24 in unison. A low-pressure (LP) shaft 36 or a spool drivingly connects the LP turbine 30 to the LP compressor 22, to rotate the LP turbine 30 and the LP compressor 22 in unison. The compressor section 21, the combustion section 26, the turbine section 27, and the jet exhaust nozzle section 32 together define a core air flowpath.

For the embodiment depicted in FIG. 1, the fan section 14 includes a fan 38 (e.g., a variable pitch fan or fixed pitch fan) having a plurality of fan blades 40 coupled to a disk 42 in a spaced apart manner. As depicted in FIG. 1, the fan blades 40 extend outwardly from the disk 42 generally along the radial direction R. Each fan blade 40 is rotatable relative to the disk 42 about a pitch axis P by virtue of the fan blades 40 being operatively coupled to an actuation member 44 configured to collectively vary the pitch of the fan blades 40 in unison.

The fan blades 40, the disk 42, and the actuation member 44 are together rotatable about the longitudinal centerline axis 12 via a fan shaft 45 that is powered by the LP shaft 36 across a power gearbox, also referred to as a gearbox assembly 46. The gearbox assembly 46 is shown schematically in FIG. 1. The gearbox assembly 46 includes a plurality of gears for adjusting the rotational speed of the fan shaft 45 and, thus, the fan 38 relative to the LP shaft 36.

Referring still to the embodiment of FIG. 1, the disk 42 is covered by a rotatable fan hub 48 aerodynamically contoured to promote an airflow through the plurality of fan blades 40. In addition, the fan section 14 includes an annular fan casing or a nacelle 50 that circumferentially surrounds the fan 38 and/or at least a portion of the turbo-engine 16. The nacelle 50 is supported relative to the turbo-engine 16 by a plurality of circumferentially spaced outlet guide vanes 52. Moreover, a downstream section 54 of the nacelle 50 extends over an outer portion of the turbo-engine 16 to define a bypass airflow passage 56 therebetween.

During operation of the turbine engine 10, a volume of air 58 enters the turbine engine 10 through an inlet 60 of the nacelle 50 and/or the fan section 14. As the volume of air 58 passes across the fan blades 40, a first portion of air 62 is directed or routed into the bypass airflow passage 56, and a second portion of air 64 is directed or is routed into the upstream section of the core air flowpath, or, more specifically, into the annular inlet 20 of the LP compressor 22. The ratio between the first portion of air 62 and the second portion of air 64 is commonly known as a bypass ratio. The pressure of the second portion of air 64 is then increased, forming compressed air 65, and the compressed air 65 is routed through the HP compressor 24 and into the combustion section 26, where the compressed air 65 is mixed with fuel and burned to provide combustion gases 66.

The combustion gases 66 are routed into the HP turbine 28 and expanded through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft 34, thus, causing the HP shaft 34 to rotate, thereby supporting operation of the HP compressor 24. The combustion gases 66 are then routed into the LP turbine 30 and expanded through the LP turbine 30. Here, a second portion of the thermal energy and the kinetic energy is extracted from the combustion gases 66 via sequential stages of LP turbine stator vanes 72 that are coupled to the outer casing 18 and LP turbine rotor blades 74 that are coupled to the LP shaft 36, thus, causing the LP shaft 36 to rotate, thereby supporting operation of the LP compressor 22 and rotation of the fan 38 via the gearbox assembly 46.

The combustion gases 66 are subsequently routed through the jet exhaust nozzle section 32 of the turbo-engine 16 to provide propulsive thrust. Simultaneously, the pressure of the first portion of air 62 is substantially increased as the first portion of air 62 is routed through the bypass airflow passage 56 before being exhausted from a fan nozzle exhaust section 76 of the turbine engine 10, also providing propulsive thrust. The HP turbine 28, the LP turbine 30, and the jet exhaust nozzle section 32 at least partially define a hot gas path 78 for routing the combustion gases 66 through the turbo-engine 16.

The turbine engine 10 depicted in FIG. 1 is by way of example only. In other exemplary embodiments, the turbine engine 10 may have any other suitable configuration. For example, in other exemplary embodiments, the fan 38 may be configured in any other suitable manner (e.g., as a fixed pitch fan) and further may be supported using any other suitable fan frame configuration. Moreover, in other embodiments, any other suitable number or configuration of compressors, turbines, shafts, or a combination thereof may be provided. In still other embodiments, aspects of the present disclosure may be incorporated into any other suitable turbine engine, such as, for example, turbofan engines, propfan engines, turbojet engines, turboprop, and/or turboshaft engines.

Figure 2:
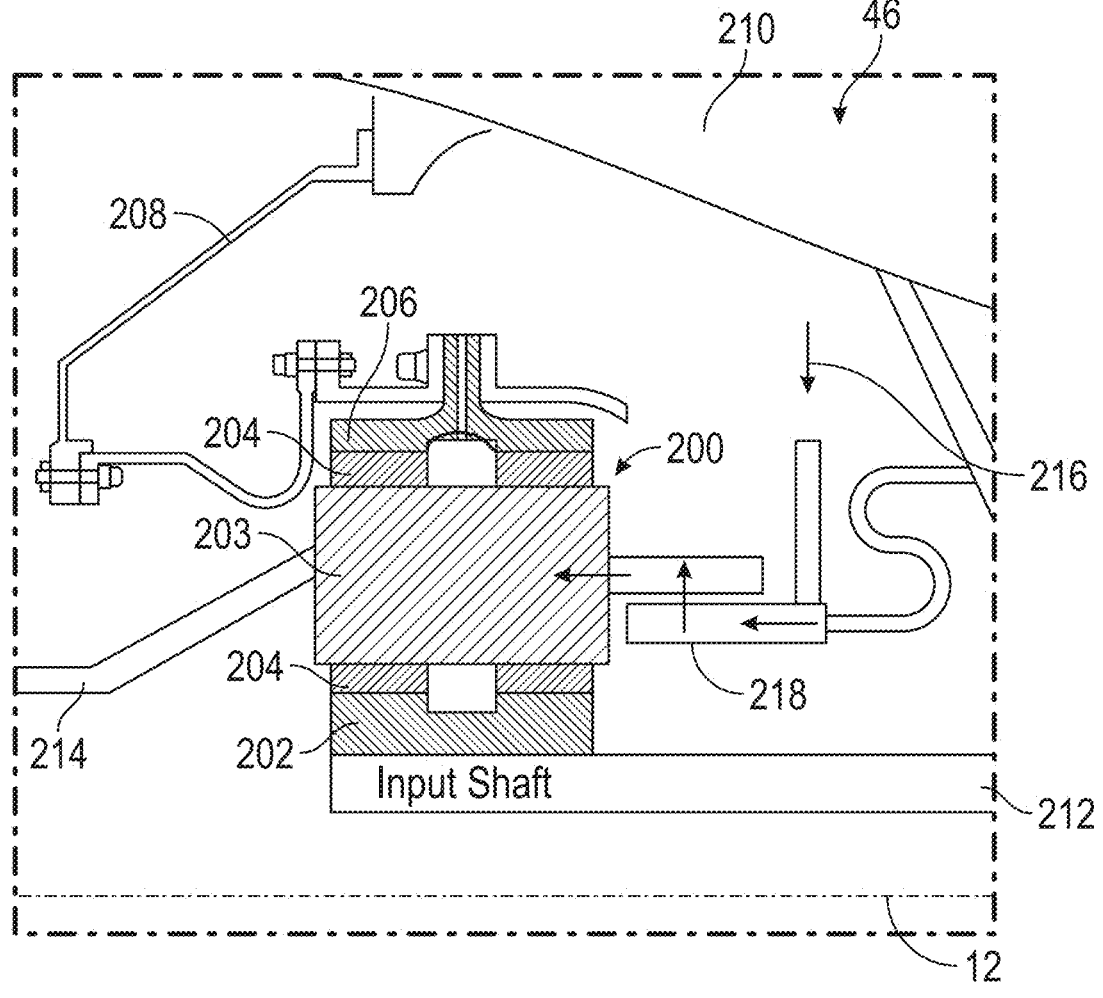
FIG. 2 is a schematic, cross-sectional detail view of a gearbox assembly shown in FIG. 1, according to an embodiment of the present disclosure.

FIG. 2 is a schematic, cross-sectional detail view of the gearbox assembly 46 shown in FIG. 1, according to an embodiment of the present disclosure. As shown in FIG. 2, the gearbox assembly 46 includes a plurality of gears 200 for adjusting the rotational speed of the fan shaft 45 and, thus, the fan 38 relative to the LP shaft 36 (shown in FIG. 1). The plurality of gears 200 include a sun gear 202, a plurality of planet gears 204, and a ring gear 206. In the configuration shown in FIG. 2, the ring gear 206 is stationary and is coupled via a mounting structure 208 to a static structure 210 of the turbine engine 10 (shown in FIG. 1). An input shaft 212 is connected to the sun gear 202. The input shaft 212 can be, for example, the LP shaft 36 (shown in FIG. 1). An output shaft 214 is coupled to the planet gears 204 via a planet pin 203. The output shaft 214 can be, for example, the fan shaft 45 that is connected to the fan 38 (shown in FIG. 1). A lubricant 216 is provided to the gearbox assembly 46 via an oil transfer device 218.

Figure 3:
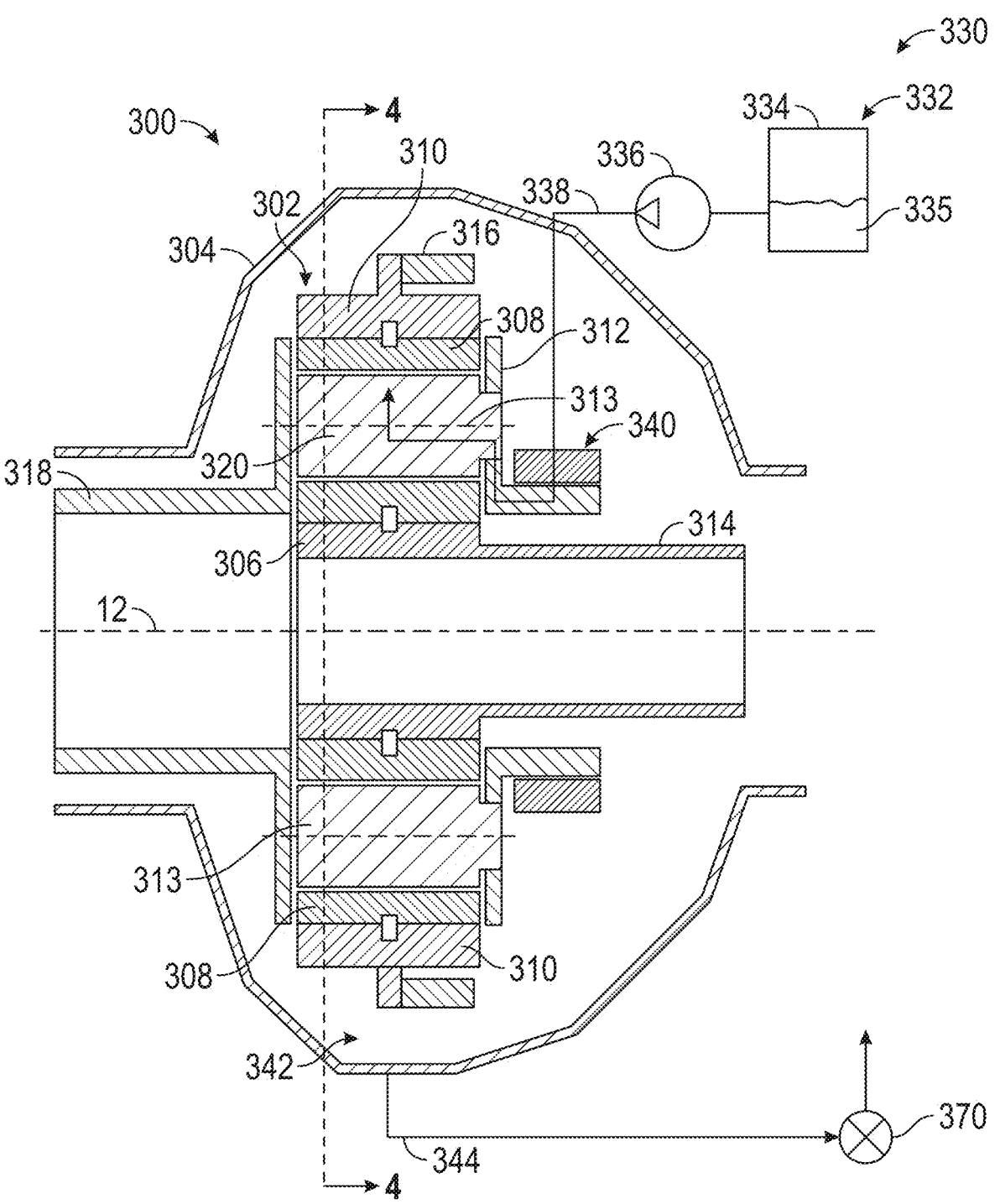
FIG. 3 is a schematic, cross-sectional side view of the gearbox assembly, taken along a longitudinal centerline axis of the turbine engine shown in FIG. 1, according to the present disclosure.
Figure 4:
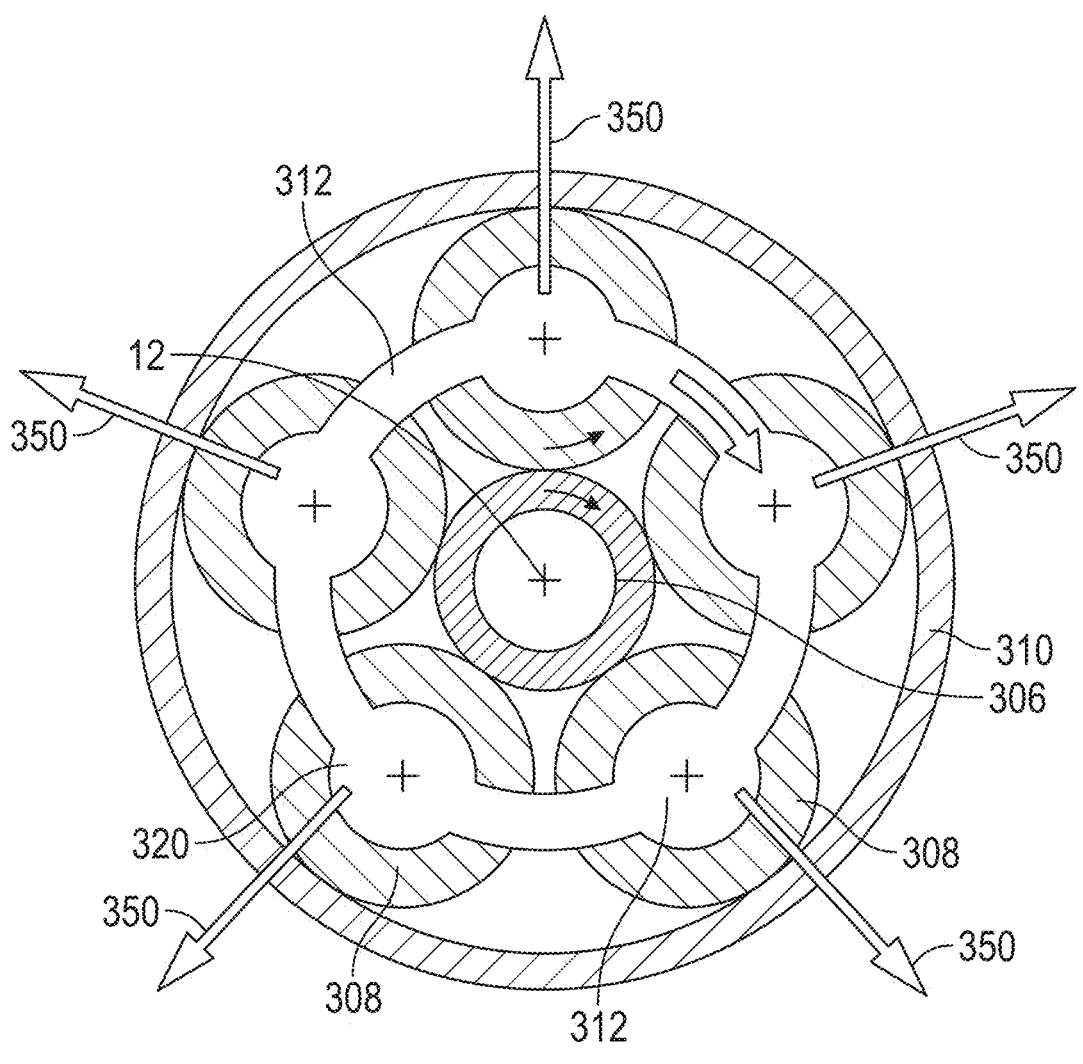
FIG. 4 is a schematic, cross-sectional view of the gearbox assembly taken along line 4-4 shown in FIG. 3, perpendicular to the longitudinal centerline axis, according to an embodiment of the present disclosure.

FIG. 3 is a schematic, cross-sectional side view of a gearbox assembly 300 for the turbine engine 10 (shown in FIG. 1), taken along a longitudinal centerline axis 12 of the turbine engine 10, according to the present disclosure. FIG. 4 is a schematic, cross-sectional view of the gearbox assembly 300 taken along line 4-4 shown in FIG. 3, perpendicular to the longitudinal centerline axis 12, according to an embodiment of the present disclosure. The gearbox assembly 300 can be utilized as the gearbox assembly 46 of FIG. 1.

The gearbox assembly 300 includes an epicyclic gear assembly 302 enclosed by a gearbox casing 304. The epicyclic gear assembly 302 includes a sun gear 306, a plurality of planet gears 308 (only two of which are visible in FIG. 3), and a ring gear 310. For clarity, only a portion of the gears is shown. The plurality of planet gears 308 are contained and supported by a planet carrier 312 (shown schematically in FIG. 3).

Referring to both FIG. 3 and FIG. 4, in an embodiment, the gearbox assembly 300 is a planetary configuration. In the planetary configuration, the ring gear 310 is held fixed, with the planet carrier 312 allowed to rotate around the sun gear 306, as shown, for example, in FIG. 4. For example, the ring gear 310 is coupled to a static structure 316 of the turbine engine 10 (shown as static structure 210 in FIG. 2). In such a configuration, the fan 38 (shown in FIG. 1) is driven via the fan shaft 45 (shown in FIG. 1) by the planet carrier 312. In this way, the plurality of planet gears 308 are an output of the gearbox assembly 300. FIG. 4 also shows a centrifugal force 350 created by the planet gears 308 and bearing system (shown in FIG. 5) orbiting about the longitudinal centerline axis 12.

The gearbox assembly 300 includes an input shaft 314. In FIG. 3, the input shaft 314 is coupled to the sun gear 306, or the input shaft 314 and the sun gear 306 are a single unitary component. In some embodiments, the sun gear 306 and the input shaft 314 are separate components and the input shaft 314 is coupled to the sun gear 306. The input shaft 314 is coupled to the turbine section 27 (shown in FIG. 1). For example, the input shaft 314 can be coupled to, or can embody, the LP shaft 36 (shown in FIG. 1). Radially outward of the sun gear 306, and intermeshing therewith, is the plurality of planet gears 308 that are coupled together and supported by the planet carrier 312. The planet carrier 312 supports the plurality of planet gears 308 such that the plurality of planet gears 308 rotate around the sun gear 306 while enabling each planet gear 308 of the plurality of planet gears 308 to rotate about a planet gear longitudinal centerline axis 313 of each planet gear 308 (shown in FIG. 3). The ring gear 310 is coupled to an output shaft 318 that is connected to the fan 38 (shown in FIG. 1). The ring gear 310 rotates to drive rotation of the fan 38 (shown in FIG. 1) about the longitudinal centerline axis 12. For example, the output shaft 318 is coupled to the fan shaft 45 (shown in FIG. 1). In some embodiments, the output shaft 318 and the fan shaft 45 (shown in FIG. 1) are formed as a single integral component. The ring gear 310 is an annular ring gear located radially outwardly of the plurality of planet gears 308, and is intermeshing therewith. The ring gear 310 is operatively coupled to the plurality of planet gears 308.

Each of the planet gears 308 includes a planet pin 320 (corresponding to planet pin 203 in FIG. 2), about which a respective planet gear 308 rotates. For example, the planet pin 320 is disposed within a respective planet gear 308. A lubricant 335 (e.g., oil) is provided between the planet pin 320 and a respective planet gear 308 such that the planet gear 308 rotates with respect to the planet pin 320. In addition, the lubricant 335 is also provided between the plurality of planet gears 308 and the ring gear 310.

The gearbox assembly 300 includes a lubrication system 330 for supplying the lubricant 335 (e.g., oil) to each planet gear 308, as well as to other components of the gearbox assembly 300 (e.g., the sun gear 306, the ring gear 310, etc.). The lubrication system 330 includes a primary lubrication system 332. The primary lubrication system 332 includes a main lubricant tank 334 for storing the lubricant 335 therein. For example, the main lubricant tank 334 can store oil therein. The primary lubrication system 332 includes several components, among which are a lubricant pump 336 and a primary lubricant line 338. The lubricant pump 336 is coupled to and powered by, for example, the HP shaft 34 (shown in FIG. 1). For example, rotation of the HP shaft 34 causes the lubricant pump 336 to pump the lubricant 335 from the main lubricant tank 334. The lubricant pump 336 can include any type of pump for pumping the lubricant 335 from the main lubricant tank 334. The primary lubricant line 338 is coupled to a lubricant transfer device 340 for transferring the lubricant 335 from the primary lubricant line 338 to the planet gears 308. In this way, each of the plurality of planet gears 308 rotates around the planet pin 320 about the planet gear longitudinal centerline axis 313. The rotation of the plurality of planet gears 308 is converted into an orbiting of the planet carrier 312 around the sun gear 306. This results in the plurality of planet gears 308 and bearings to orbit about the longitudinal centerline axis 12. The lubricant transfer device 340 allows transfer of the lubricant 335 from a stationary component (e.g., the primary lubricant line 338) to a rotating component (e.g., the sun gear 306, the planet gears 308, and the planet carrier 312).

The gearbox assembly 300 also includes a sump 342 and a scavenge line 344. The sump 342 is located at a bottom of the gearbox assembly 300 in the orientation of the gearbox assembly 300, shown in FIG. 3. The lubricant 335 supplied to the gearbox assembly 300 is drained into the sump 342. In this way, the sump 342 serves as a reservoir for collecting and storing lubricant 335 that drains from the rotating ring gear 310 or from other portions of the gearbox assembly 300. For example, gravity causes the lubricant 335 to flow between the ring gear 310 and the gearbox casing 304 to the sump 342 during operation of the gearbox assembly 300.

The scavenge line 344 provides fluid communication from the sump 342 to a scavenge pump 370 to a deaerator (not shown), and then to the main lubricant tank 334. In this way, the lubricant 335 in the sump 342 is provided from the sump 342 back to the main lubricant tank 334 through the scavenge line 344 such that the lubricant 335 circulates through the primary lubrication system 332.

In operation, the lubricant pump 336 pumps lubricant 335 from the main lubricant tank 334 into the primary lubricant line 338. The primary lubricant line 338 operably directs the lubricant 335 into the lubricant transfer device 340. The lubricant transfer device 340 operably directs the lubricant 335 into rotating bearings. In this way, the lubricant 335 is supplied to the planet gears 308 to allow rotation of the planet gears 308 about the planet pin 320 (e.g., about the planet gear longitudinal centerline axis 313 of the planet gear 308), reducing friction. The lubricant 335 flows from planet gears 308 to the sump 342 after lubricating and flows between the ring gear 310 and the gearbox casing 304 to the sump 342. The lubricant 335 then flows back to the main lubricant tank 334 through the scavenge line 344.

Figure 5:
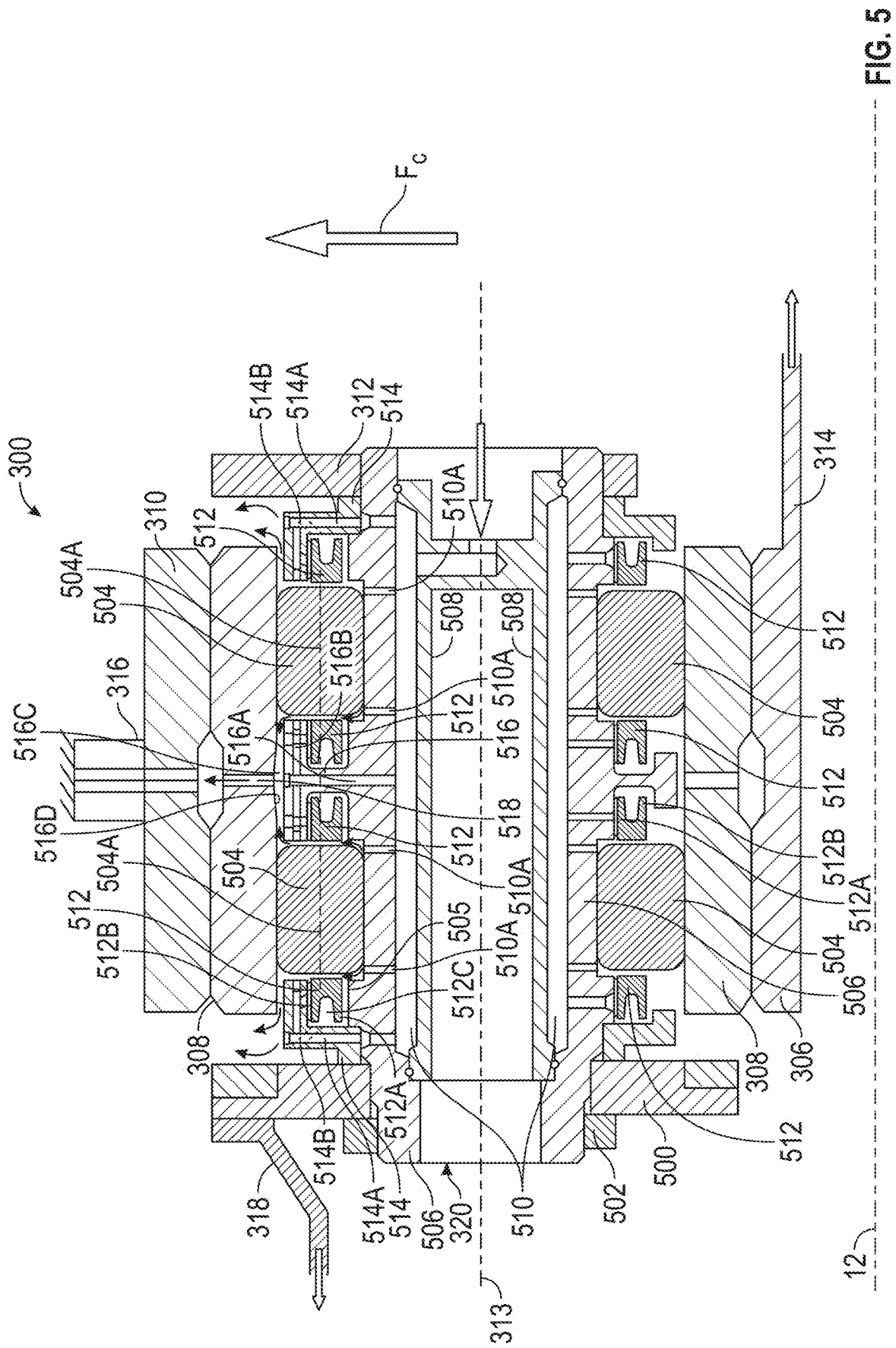
FIG. 5 is a schematic, cross-sectional view of a gearbox assembly, according to an embodiment of the present disclosure.

FIG. 5 is a schematic cross-sectional view of a gearbox assembly 300, according to an embodiment of the present disclosure. FIG. 5 shows more details of the gearbox assembly 300, in particular, details of the planet pin 320. The planet pin 320 orbits about the longitudinal centerline axis 12, whereas the planet gear 308 and a REB cage 512 (described further in detail below) spin about the planet gear longitudinal centerline axis 313. As shown in FIG. 5, each of the planet gears 308 includes a planet pin 320 (corresponding to planet pin 203 in FIG. 2), about which a respective planet gear 308 rotates. The planet pin 320 is connected to the output shaft 318 via a carrier adapter plate 500. A spanner lock nut 502 is used to fasten the carrier adapter plate 500 to the planet pin 320. A plurality of planet bearing rollers 504 are disposed between planet pin 320 and each of the plurality of planet gears 308. The plurality of planet bearing rollers 504 are configured for transferring a rotation of the planet gear 308 to the planet pin 320, while supporting gear loads between the two components. An oil delivery sleeve 508 is provided between an inner race 506 and the planet pin 320. The inner race 506 is coupled to the carrier adapter plate 500. The carrier adapter plate 500 is coupled to the planet pin 320 via the inner race 506. A lubricant delivery system 510 is used to provide lubricant to the plurality of planet bearing rollers 504. The lubricant delivery system 510 is connected to the primary lubricant line 338, which is coupled to a lubricant transfer device 340 for transferring the lubricant 335 from the primary lubricant line 338 to the plurality of planet gears 308 (as shown in FIG. 3).

In a planetary configuration, the planet gear 308 is subjected to centrifugal loading due to the rotating planet carrier 312 connected to the rotating planet pin 320. The rotating planet carrier 312 forces the planet gear 308 to orbit about the longitudinal centerline axis 12. The rotation of the of the planet carrier 312 together with the rotation of the planet pin 320 applies a centrifugal force that can push the planet gear 308 radially away from the planet pin 320. This creates a radial G-load on the planet gear 308. The radial G-load on the planet gear 308 is supported by the planet bearing rollers 504, which transmits the load to the planet pin 320. The carrier adapter plate 500 is used for assembly. The planet bearing assembly (including the planet bearing rollers 504, and the REB cage 512) may not fit and slide towards the planet carrier 312 from the left to the right, in FIG. 5, if the planet carrier 312 has a smaller diameter on the left side. Therefore, a larger hole in the planet carrier 312 on the left side is needed to slide the planet bearing assembly into the planet carrier 312 and then the carrier adapter plate 500 is used to connect the planet pin 320 to the planet carrier 312 only on the left-hand side, in FIG. 5.

For relatively high centrifugal forces (relatively high G loads) the plurality of planet bearing rollers 504 are used between the planet gear 308 and the planet pin 320 to maintain the planet gear 308 relatively centered around the planet gear longitudinal centerline axis 313. The use of the plurality of planet bearing rollers 504 (i.e., solid bearings), instead of the conventional journal bearing relying solely on fluid pressure provided by the lubricant, is that even in the case of lack or deterioration of the lubricant of the journal bearing (for example, due to a failure of the lubricant pump 336 shown in FIG. 3) or a rotation of the planet gear 308 being halted, the use of the plurality of planet bearing rollers 504 allows the planet gear 308 to continue rotating by being supported by the plurality of planet bearing rollers 504.

However, the plurality of planet bearing rollers 504 may also move radially away from the planet pin 320 towards the planet gear 308. Therefore, the REB cage 512 is provided to guide and to position the plurality of planet bearing rollers 504 in an equally spaced configuration (i.e., substantially equally spaced apart). The REB cage 512 is configured to align a rotation axis 504A of each of the plurality of planet bearing rollers 504 relative to each other. Without using the REB cage 512, the plurality of planet bearing rollers 504 will become skewed and misaligned, causing the plurality of bearing rollers 504 to run into each other. The REB cage 512 has an outer diameter (OD) guide ring 514 to keep the rotation axis 504A of the plurality of planet bearing rollers 504 substantially parallel to the planet gear longitudinal centerline axis 313 of the planet gear 308. The REB cage 512 is configured to keep the plurality of planet bearing rollers 504 spaced apart in the longitudinal direction along the planet gear longitudinal centerline axis 313 of the planet gear 308. The REB cage 512 is a monolithic part with windows cut out from the monolithic part to provide spacing for the plurality of planet bearing rollers 504 around a circumference of the plurality of planet bearing rollers 504. The REB cage 512 can also be subjected to the centrifugal force Fe and, thus, would also be pushed radially away from the planet pin 320.

The REB cage 512 has an inner diameter (ID) surface 512A and an outer diameter (OD) surface 512B. The inner diameter (ID) surface 512A of the REB cage 512 generally faces the planet pin 320. The outer diameter (OD) surface 512B of the REB cage 512 faces opposite to the planet pin 320. Generally, there is no rolling element or other supporting element supporting the REB cage 512 between the REB cage 512 and the planet pin 320. Because the plurality of planet bearing rollers 504 rotate with the REB cage 512 and the REB cage 512 may come in contact with the planet pin 320, a lubricant film is provided between the inner diameter (ID) surface 512A of the REB cage 512 and the planet pin 320 to create a journal bearing for the REB cage 512 to allow the REB cage 512 to rotate with less friction.

In addition, the outer diameter (OD) guide ring 514 is provided radially outward of the outer diameter (OD) surface 512B of the REB cage 512 to hold the REB cage 512 in place relative to the planet gear longitudinal centerline axis 313. The outer diameter (OD) guide ring 514 is provided at each end of the gearbox assembly 300 (near the carrier adapter plate 500 and near the planet carrier 312). Hence, in addition to providing a lubricant film between the inner diameter surface 512A of the REB cage 512 and the planet pin 320, another lubricant film (e.g., a supporting hydrodynamic lubricant film) is also provided between the outer diameter surface 512B of the REB cage 512 and the outer diameter (OD) guide ring 514. The outer diameter (OD) guide ring 514 is connected to the carrier adapter plate 500, on the left side of FIG. 5, and is connected to the planet carrier 312, on the right side of FIG. 5.

Also, an integral outer guide ring 505 is integral to the planet pin 320. The integral outer guide ring 505 is configured to support the inner diameter surface 512A of the REB cage 512. By adding the outer diameter (OD) guide ring 514, two load bearing surfaces, that is, the inner diameter surface 512A and the outer diameter surface 512B of the REB cage 512, can be used. During rotation of the plurality of planet gears 308, a load on the REB cage 512 is split between the inner diameter surface 512A and the outer diameter surface 512B of the REB cages 512. The REB cage 512 is housed within an REB cage cavity 512C defined by the outer diameter (OD) guide ring 514, the planet bearing roller 504 and the planet pin 320.

In addition, there is also provided an integral inner guide ring 516 that is provided between two contiguous REB cages 512. The integral inner guide ring 516 is configured to support the inner diameter surface 512A and the outer diameter surface 512B of the two contiguous REB cages 512. The integral inner guide ring 516 is integral to the lubricated inner race 506 near the planet pin 320. The integral inner guide ring 516 has a T-shaped cross section so as to hold the contiguous REB cages 512. The use of an integral inner guide ring 516 that is integral to the inner race 506 instead of providing a separate mounted piece allows for a reduction in the number of components in the gearbox assembly 300. The two contiguous REB cages 512 are separated apart by the integral inner guide ring 516.

Lubricant from the lubricant transfer bearing (e.g., oil transfer bearing OTB) is provided through the lubricant delivery system 510, which is connected to the primary lubricant line 338, which is coupled to the lubricant transfer device 340 for transferring the lubricant 335 from the primary lubricant line 338 to the planet gears 308 (as shown in FIG. 3). The lubricant from the lubricant delivery system 510 is also distributed to the plurality of planet bearing rollers 504 through a plurality of lubricant conduits 510A within the inner race 506 (also referred to as "under-race lubrication"). The lubricant from the lubricant delivery system 510 is also guided through a lubricant conduit 514A within the outer diameter (OD) guide ring 514 to provide a lubricant film between the inner diameter surface 512A of the REB cage 512 and the inner race 506, and to provide a lubricant film between the outer diameter surface 512B of the REB cage 512 and the outer diameter (OD) guide ring 514.

In addition, the lubricant from lubricant delivery system 510 is also guided through a first lubricant conduit 516A and a second lubricant conduit 516B within the integral inner guide ring 516 to provide a lubricant film between the inner diameter surface 512A of the REB cage 512 and the inner race 506, and to provide a lubricant film between the outer diameter surface 512B of the REB cage 512 and the integral inner guide ring 516. The first lubricant conduit 516A and the second lubricant conduit 516B form a T-shape that allows lubricant to be guided through the first lubricant conduit 516A and be split into two lubricant flows through the second lubricant conduit 516B to deliver lubricant to each of the two contiguous REB cages 512.

In operation, lubricant is delivered through the lubricant delivery system 510 and is distributed through the plurality of lubricant conduits 510A, the lubricant conduit 514A within the outer diameter (OD) guide ring 514, the first lubricant conduits 516A within the integral inner diameter guide ring 516, and the second lubricant conduit 516B within the integral inner guide ring 516. The lubricant is delivered to lubricate the planet bearing rollers 504 and the REB cages 512. The lubricant used for lubrication is then evacuated or removed through port holes and channels. For example, angled port holes 514B are provided within the outer diameter (OD) guide ring 514 to remove or scavenge lubricant within the REB cage cavity 512C. In addition, lubricant is also evacuated through an integral inner guide ring channel 516C defined between the integral inner guide ring 516 and a tapered surface 516D of the planet gears 308. The lubricant in the integral inner guide ring channel 516C is then evacuated through a planet gear conduit 518 with the planet gears 308. The black arrows in FIG. 5 illustrate an example lubricant flow during operation of the gearbox assembly 300.

Figure 6A:
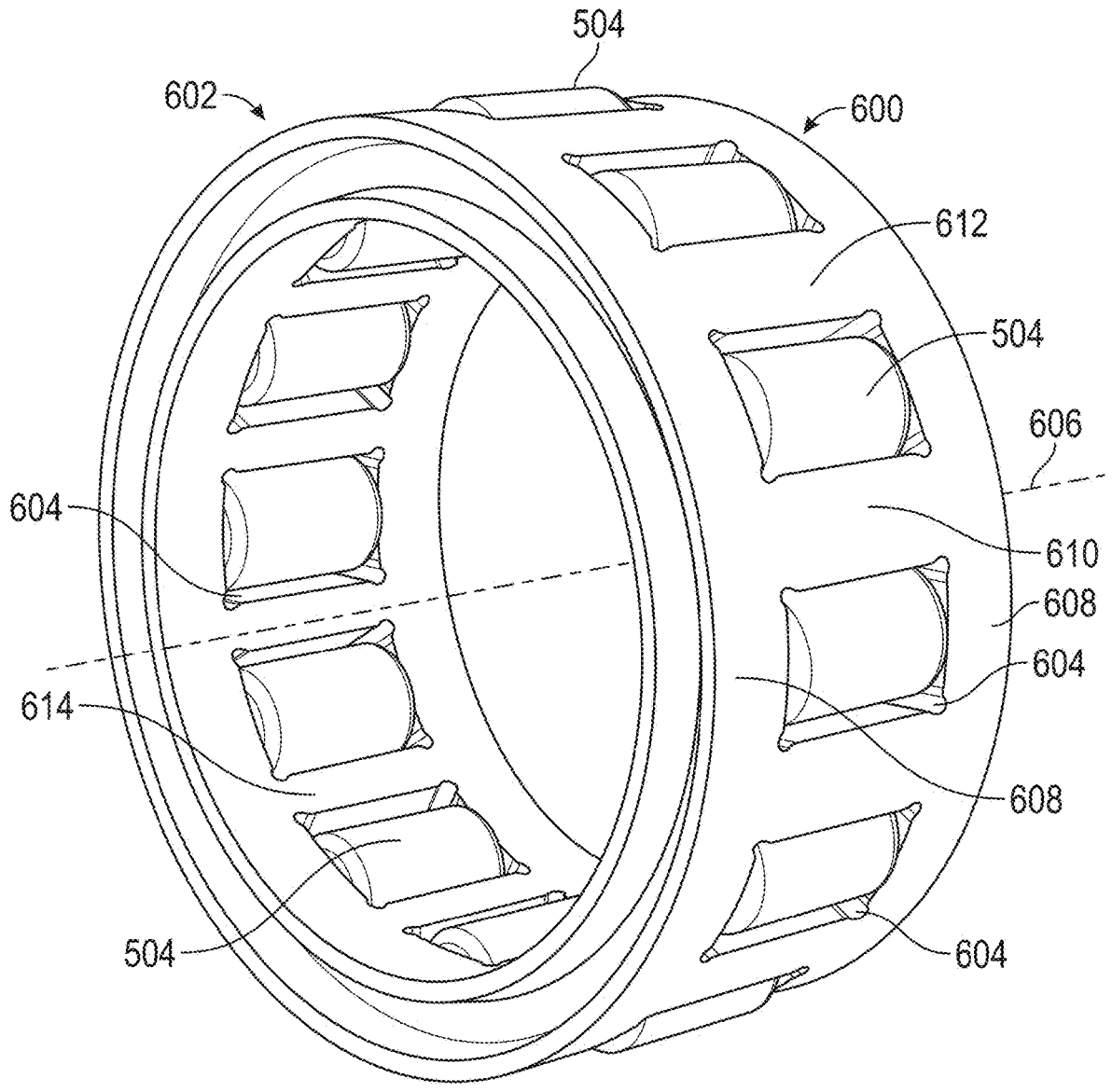
FIG. 6A is a perspective view of a rolling element bearing (REB) cage of the gearbox assembly shown in FIG. 5, according to an embodiment of the present disclosure.

FIG. 6A is a perspective view of a REB cage 600, according to an embodiment of the present disclosure. The REB cage 600 can be used as the REB cage 512 described above. As shown in FIG. 6, the REB cage 600 includes a cylindrical body 602. The cylindrical body 602 includes a plurality of pocket openings 604 defined within and positioned circumferentially about cylindrical body 602. Specifically, the plurality of pocket openings 604 are positioned circumferentially relative to a centerline 606 of cylindrical body 602. The REB cage 600 further includes a pair of circumferential side rails 608 and a plurality of cross rails 610 extending between the pair of circumferential side rails 608, such that the plurality of pocket openings 604 are defined therebetween. In addition, the plurality of pocket openings 604 are formed within the cylindrical body 602 such that an outer radial portion 612 of the plurality of cross rails 610 is thicker than an inner radial portion 614 of the plurality of cross rails 610. For example, the outer radial portion 612 of the plurality of cross rails 610 of the REB cage 600 corresponds to the outer diameter surface 512B of the REB cage 512 of FIG. 5. For example, the inner radial portion 614 of the plurality of cross rails 610 of the REB cage 600 corresponds to the inner diameter surface 512A of the REB cage 512 of FIG. 5.

As described above, the plurality of planet bearing rollers 504 are received within respective pocket openings 604. More specifically, the plurality of planet bearing rollers 504 are radially inserted within each of the plurality of pocket openings 604. The plurality of pocket openings 604 are oversized relative to the plurality of planet bearing rollers 504 such that the plurality of planet bearing rollers 504 freely move the plurality of pocket openings 604 and are forced against circumferential side rails 608 and/or cross rails 610 when a centrifugal load is induced during operation of the gearbox assembly 300 (shown in FIG. 5). As such, the REB cage 600 guides circumferential and axial movement of the plurality of planet bearing rollers 504 within the plurality of pocket openings 604. In an embodiment, the plurality of pocket openings 604 have a rectangular cross section adapted to receive the plurality of planet bearing rollers 504 that are cylindrically shaped.

Figures 6B, 6C:
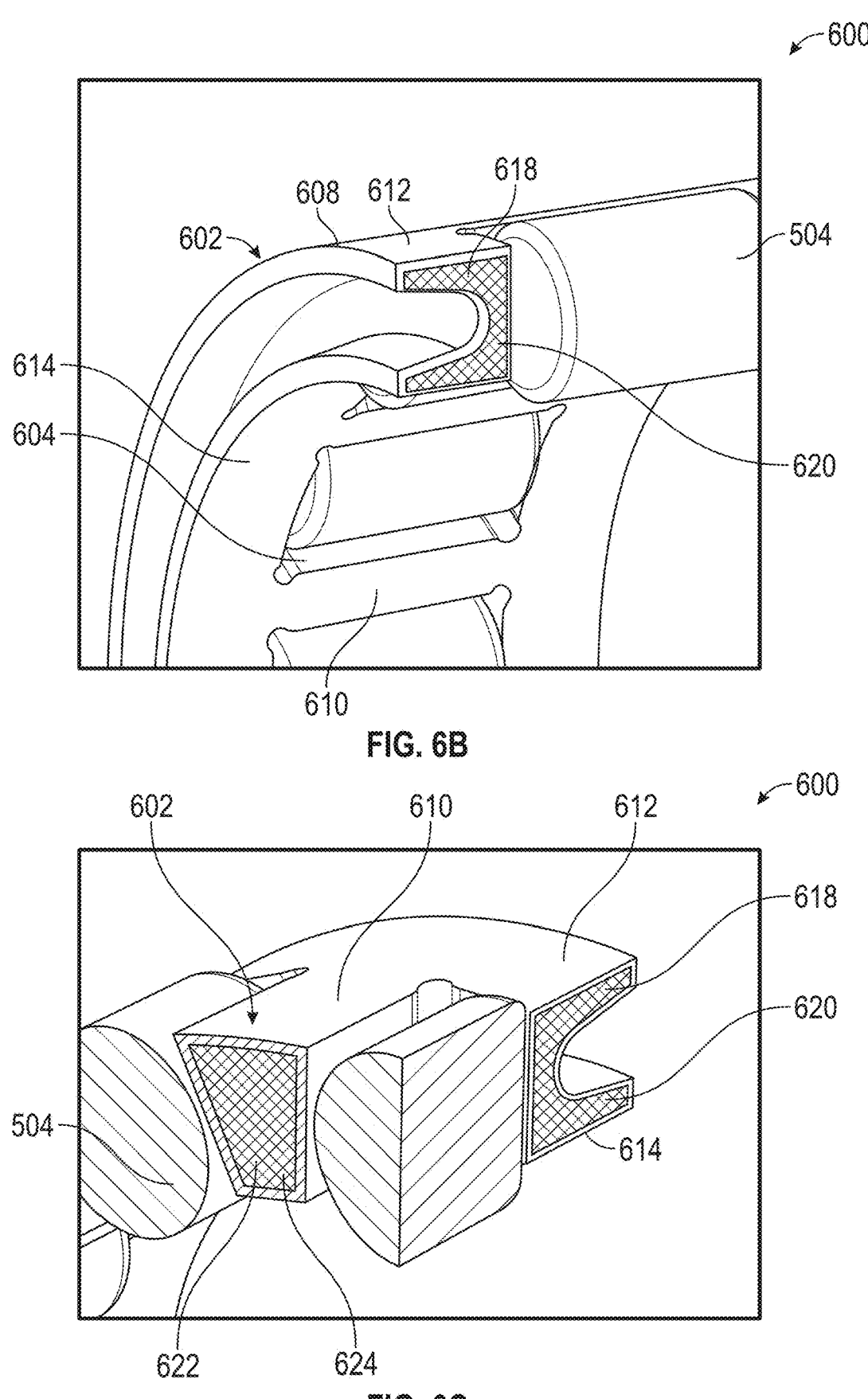
FIG. 6B is a partial cutaway view of the REB cage shown in FIG. 6A showing an interior structure of circumferential side rails of the REB cage, according to an embodiment of the present disclosure.
FIG. 6C is another partial cutaway view of the REB cage shown in FIG. 6A showing an interior structure of cross rails of the REB cage, according to an embodiment of the present disclosure.

FIG. 6B is a partial cutaway view of the REB cage 600 shown in FIG. 6A showing an interior structure of the circumferential side rails 608, according to an embodiment of the present disclosure. In an embodiment, at least a portion of the cylindrical body 602 is hollow for reducing the mass of the REB cage 600. For example, the circumferential side rails 608 can have a hollow cavity 618. The hollow cavity 618 of the circumferential side rails 608 of the cylindrical body 602 of the REB cage 600 can be provided with a reinforcement structure 620. The reinforcement structure 620 within the hollow cavity 618 may include a porous material such as, a polyether ether ketone material, or a foam material, such as metal foam, or a wire mesh.

FIG. 6C is another partial cutaway view of the REB cage 600 shown in FIG. 6A showing an interior structure of the cross rails 610, according to an embodiment of the present disclosure. In an embodiment, at least a portion of the cylindrical body 602 is hollow for reducing the mass of the REB cage 600. For example, in addition to the circumferential side rails 608 having the hollow cavity 618, the cross rails 610 can also have a hollow cavity 622. The hollow cavity 622 of the cross rails 610 of the cylindrical body 602 of the REB cage 600 can also be provided with a reinforcement structure 624. The reinforcement structure 624 within the hollow cavity 622 may include a porous material such as, a polyether ether ketone material, or a foam material, such as metal foam, or a wire mesh.

Figures 7, 8:
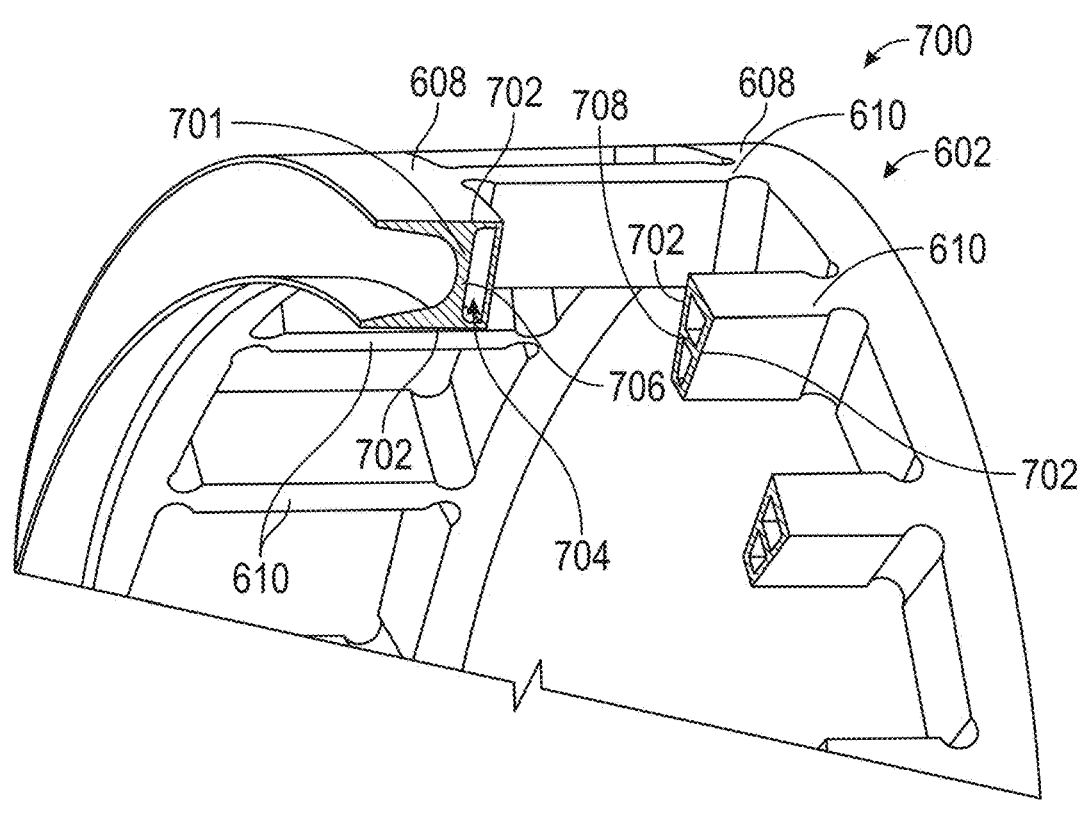
FIG. 7 is a partial cutaway view of an REB cage, according to an embodiment of the present disclosure.
FIG. 8 is a partial cutaway and partially transparent view of an REB cage, including an alternative reinforcement structure, according to another embodiment of the present disclosure.

FIG. 7 is a partial cutaway view of an REB cage 700, according to an embodiment of the present disclosure. The REB cage 700 further includes a reinforcement structure 701 extending within the portion of the cylindrical body 602 that is hollow. As such, the reinforcement structure 701 provides a stiffening force or a strengthening force to the cylindrical body 602, and reintroduces structural integrity to the pocket openings 604 in the cylindrical body 602. In an alternative embodiment, the reinforcement structure 701 may be omitted from the cylindrical body 602, and the cylindrical body 602 can be completely hollow for reducing the mass of REB cage 700.

As described above, the REB cage 700 includes a pair of circumferential side rails 608 and a plurality of cross rails 610 extending between the pair of circumferential side rails 608. In an embodiment, at least one of the pair of circumferential side rails 608 and the plurality of cross rails 610 are hollow for receiving the reinforcement structure 701 therein. More specifically, the hollow portion of the cylindrical body 602 includes opposing side walls 702 defining a hollow cavity 704. The reinforcement structure 701 interconnects the opposing side walls 702. The reinforcement structure 701 may be any suitable structural support that enables the REB cage 600 to function as described herein. In addition, in some embodiments, the reinforcement structure 701 can be oriented within the hollow cavity 704 based on a predetermined direction of greatest directional loading received at different sections of the cylindrical body 602 during operation of the gearbox assembly 300 (shown in FIG. 5).

For example, during operation of gearbox assembly 300, the greatest load induced to the pair of circumferential side rails 608 is in a radial direction as a result of centrifugal loading, and the greatest load induced to the plurality cross rails 610 is in a circumferential direction as a result of engagement with rotating plurality of the planet bearing rollers 504 (shown in FIG. 5). In some embodiments, the reinforcement structure 701 provides a directional stiffening force, in that the reinforcement structure 701 provides a greater stiffening force in one direction than in another direction. As such, the reinforcement structure 701 is positioned such that the directional stiffening force provided therefrom is oriented for offsetting the directional loading induced to the different sections of the cylindrical body 602.

For example, referring to FIG. 7, the reinforcement structure 701 includes a first rib member 706 extending between opposing side walls 702 of the pair of circumferential side rails 608 and a second rib member 708 extending between the opposing side walls 702 of the plurality of cross rails 610. The first rib member 706 and the second rib member 708 facilitate increasing the shear and bending load stiffness of the REB cage 600. As described above, the reinforcement structure 701 is oriented based on directional loading received at a different section of the cylindrical body 602. In the present embodiment, the first rib member 706, extending within the pair of the circumferential side rails 608, is oriented radially relative to the centerline 606 (shown in FIG. 6) of the cylindrical body 602. In addition, the second rib member 708, extending within the plurality of cross rails 610, is oriented circumferentially relative to the centerline 606 of the cylindrical body 602. As such, the directional stiffening force provided by the first rib member 706 is oriented radially relative to the centerline 606 (shown in FIG. 6A), and the directional stiffening force provided by the second rib member 708 is oriented circumferentially relative to centerline 606 to facilitate offsetting the directional loading induced to the different sections of cylindrical body 602.

FIG. 8 is a partial cutaway and partially transparent view of an REB cage 800 including an alternative reinforcement structure, according to another embodiment of the present disclosure. The reinforcement structure 701 includes a honeycomb structure 801 (e.g., a porous structure) extending within the hollow portions of the cylindrical body 602. The honeycomb structure 801 includes a plurality of side walls 802 oriented for defining a plurality of hollow channels 804. As described above, the reinforcement structure 701 is oriented within the hollow cavity 704 based on a predetermined direction of greatest directional loading received at different sections of cylindrical body 602. In the exemplary embodiment, the honeycomb structure 801, positioned within the pair of circumferential side rails 608, is oriented such that side walls 802 extend radially relative to the centerline 606 (shown in FIG. 6A) of the cylindrical body 602. In addition, the honeycomb structure 801, positioned within the plurality of cross rails 610, is oriented such that side walls 802 extend circumferentially relative to the centerline 606 of the cylindrical body 602. As such, the directional stiffening force provided by the honeycomb structure 801, positioned within the pair of circumferential side rails 608, is oriented radially relative to the centerline 606, and the directional stiffening force provided by the honeycomb structure 801, positioned within the plurality of cross rails 610, is oriented circumferentially relative to centerline 606 to facilitate offsetting the directional loading induced to the different sections of cylindrical body 602.

Figure 9:
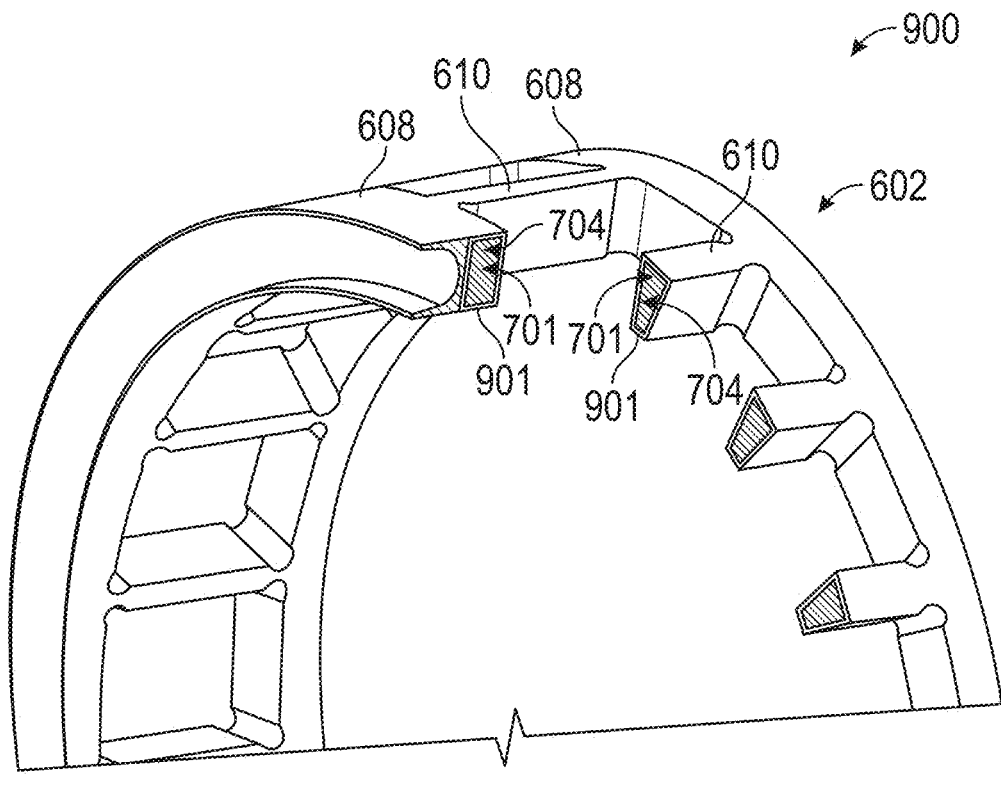
FIG. 9 is a partial cutaway view of the REB cage, according to yet another alternative embodiment of the present disclosure.

FIG. 9 is a partial cutaway view of an REB cage 900 according to yet another alternative embodiment of the present disclosure. Referring to FIG. 9, the reinforcement structure 701 includes a predetermined amount of a filler material 901 that fills the hollow cavity 704. The filler material 901 is fabricated from any material that enables the reinforcement structure 701 to function as described herein. In an embodiment, the filler material 901 is different from the material used to fabricate the cylindrical body 602. In an embodiment, the cylindrical body 602 is fabricated from a metallic material. In addition, the filler material 901 is less dense than the material used to fabricate the cylindrical body 602 such that the mass of the REB cage 600 is reduced even when the hollow cavity 704 is filled with the filler material 901. Examples of the filler material 901 include, but is not limited to, a polyether ether ketone material, and a foam material, such as metal foam or a wire mesh.

The REB cage 600, 700, 800, 900 may be formed using any manufacturing technique that enables the gearbox assembly 300 to function as described herein. For example, to achieve the at least partially hollow structure, the REB cage 600, 700, 800, 900 is formed using an additive manufacturing technique. Alternatively, the REB cage 600, 700, 800, 900 can be formed using a casting technique or a brazing technique.

Embodiments of the REB cage 600, 700, 800, 900 as described above, enable the use of high speed, small reduction ratio, planetary integral drive systems. More specifically, bearings of planetary integral drive systems are subjected to high centrifugal loads as a result of rotation of the planet carrier. The mass of the roller bearing cage can be reduced to facilitate reducing the amount of stress induced by the high centrifugal loads. In addition, the roller bearing cage includes a reinforcement structure that reintroduces structural integrity into the roller bearing cage, while still resulting in a reduced mass of the roller bearing cage. As such, strain on the roller bearing cage is mitigated, which enables the roller bearing cage to withstand greater centrifugal loads caused by rotation of the planet carrier.

Further aspects of the present disclosure are provided by the subject matter of the following clauses.

A gearbox assembly for a turbine engine comprises a plurality of planet gears, each of the plurality of planet gears being associated with a planet pin, a plurality of planet bearing rollers disposed between the planet pin and each of the plurality of planet gears, the plurality of planet bearing rollers are configured to transfer a rotation of each of the plurality of planet gears to the planet pin, a REB cage configured to guide and to position the plurality of planet bearing rollers so that the plurality of planet bearing rollers are equally spaced apart, the REB cage having an inner diameter surface facing the planet pin and an outer diameter surface facing opposite to planet pin, and an outer diameter guide ring disposed radially outward of the outer diameter surface to hold the REB cage in place relative to a planet gear longitudinal centerline axis of the plurality of planet gears. During a rotation of the plurality of planet gears, a load on the REB cage being split between the inner diameter surface and the outer diameter surface of the REB cage.

The gearbox assembly of the preceding clause, the plurality of planet bearing rollers being configured to support a rotation of each of the plurality of planet gears.

The gearbox assembly of any preceding clause, the REB cage being configured to align a rotation axis of the plurality of planet bearing rollers relative to each other.

The gearbox assembly of any preceding clause, wherein the REB cage is a monolithic part having a plurality of pocket openings configured to receive the plurality of planet bearing rollers to provide spacing for the plurality of planet bearing rollers around a circumference of the plurality of planet bearing rollers.

The gearbox assembly of any preceding clause, a lubricant film being provided between the inner diameter surface of the REB cage and the planet pin to create a journal bearing for the REB cage to allow the REB cage to rotate with less friction.

The gearbox assembly of any preceding clause, a lubricant film being provided between the outer diameter surface of the REB cage and the outer diameter guide ring to create a journal bearing for the REB cage to allow the REB cage to rotate with less friction.

The gearbox assembly of any preceding clause, the outer diameter guide ring including lubricant conduit, the lubricant conduit being configured to guide lubricant between the outer diameter surface of the REB cage and the outer diameter guide ring.

The gearbox assembly of any preceding clause, further including an integral inner guide ring that is provided between two contiguous REB cages, the integral inner guide ring configured to support the inner diameter surface and the outer diameter surface of the two contiguous REB cages.

The gearbox assembly of any preceding clause, the REB cage including a cylindrical body and a reinforcement structure extending within a portion of the cylindrical body.

The gearbox assembly of any preceding clause, the reinforcement structure including one or more rib members, a honeycomb structure extending withing hollow portions of the cylindrical body, or a filler material configured to fill a hollow cavity of the cylindrical body, or any combination thereof.

The gearbox assembly of any preceding clause, further comprising a carrier adapter plate, the planet pin being connected to an output shaft via the carrier adapter plate.

The gearbox assembly of any preceding clause, the carrier adapter plate being coupled to the planet pin via an inner race such that the inner race is coupled to the carrier adapter plate.

The gearbox assembly of any preceding clause, further comprising a lubricant delivery system, the lubricant delivery system being configured to provide lubricant to the plurality of planet bearing rollers.

The gearbox assembly of any preceding clause, the lubricant delivery system being connected to a primary lubricant line that is coupled to a lubricant transfer device, the lubricant transfer device being configured to transfer lubricant from the primary lubricant line to the plurality of planet gears.

The gearbox assembly of any preceding clause, the REB cage including an outer diameter (OD) guide ring to keep a rotation axis of the plurality of planet bearing rollers substantially parallel to a planet gear longitudinal centerline axis.

The gearbox assembly of any preceding clause, the REB cage being configured to keep the plurality of planet bearing rollers spaced apart in a longitudinal direction along the planet gear longitudinal centerline axis.

The gearbox assembly of any preceding clause, the REB cage comprising a cylindrical body, the cylindrical body having a plurality of pocket openings defined within and positioned circumferentially about the cylindrical body.

The gearbox assembly of any preceding clause, the plurality of pocket openings being positioned circumferentially relative to a centerline of the cylindrical body.

The gearbox assembly of any preceding clause, the REB cage further including a pair of circumferential side rails and a plurality of cross rails extending between the pair of circumferential side rails, such that the plurality of pocket openings are defined therebetween.

The gearbox assembly of any preceding clause, at least a portion of the cylindrical body being hollow to reduce a mass of the REB cage.

A turbine engine comprises an input shaft and an output shaft, and a gearbox assembly comprising a ring gear coupled to a static structure of the turbine engine, a sun gear coupled to the input shaft, a plurality of planet gears operatively connected to the sun gear, each of the plurality of planet gears being associated with a planet pin, the planet pin being connected to the output shaft, a plurality of planet bearing rollers disposed between the planet pin and each of the plurality of planet gears, the plurality of planet bearing rollers being configured to transfer a rotation of each of the plurality of planet gears to the planet pin, a REB cage configured to guide and to position the plurality of planet bearing rollers so that the plurality of planet bearing rollers are equally spaced apart, the REB cage having an inner diameter surface facing the planet pin and an outer diameter surface facing opposite to planet pin, and an outer diameter guide ring disposed radially outward of the outer diameter surface to hold the REB cage in place relative to a planet gear longitudinal centerline axis of the plurality of planet gears. During a rotation of the plurality of planet gears, a load on the REB cage being split between the inner diameter surface and the outer diameter surface of the REB cage.

The turbine engine of the preceding clause, the plurality of planet bearing rollers being configured to support a rotation of each of the plurality of planet gears.

The turbine engine of any preceding clause, the REB cage being configured to align a rotation axis of the plurality of planet bearing rollers relative to each other.

The turbine engine of any preceding clause, wherein the REB cage is a monolithic part having a plurality of pocket openings configured to receive the plurality of planet bearing rollers to provide spacing for the plurality of planet bearing rollers around a circumference of the plurality of planet bearing rollers.

The turbine engine of any preceding clause, a lubricant film being provided between the inner diameter surface of the REB cage and the planet pin to create a journal bearing for the REB cage to allow the REB cage to rotate with less friction.

The turbine engine of any preceding clause, a lubricant film being provided between the outer diameter surface of the REB cage and the outer diameter guide ring to create a journal bearing for the REB cage to allow the REB cage to rotate with less friction.

The turbine engine of any preceding clause, the outer diameter guide ring including lubricant conduit, the lubricant conduit being configured to guide lubricant between the outer diameter surface of the REB cage and the outer diameter guide ring.

The turbine engine of any preceding clause, wherein the gearbox assembly further includes an integral inner guide ring that is provided between two contiguous REB cages, the integral inner guide ring configured to support the inner diameter surface and the outer diameter surface of the two contiguous REB cages.

The turbine engine of any preceding clause, the REB cage including a cylindrical body and a reinforcement structure extending within a portion of the cylindrical body.

The turbine engine of any preceding clause, the reinforcement structure including one or more rib members, a honeycomb structure extending withing hollow portions of the cylindrical body, or a filler material configured to fill a hollow cavity of the cylindrical body, or any combination thereof.

The turbine engine of any preceding clause, further comprising a carrier adapter plate, the planet pin being connected to an output shaft via the carrier adapter plate.

The turbine engine of any preceding clause, the carrier adapter plate being coupled to the planet pin via an inner race such that the inner race is coupled to the carrier adapter plate.

The turbine engine of any preceding clause, further comprising a lubricant delivery system, the lubricant delivery system being configured to provide lubricant to the plurality of planet bearing rollers.

The turbine engine of any preceding clause, the lubricant delivery system being connected to a primary lubricant line that is coupled to a lubricant transfer device, the lubricant transfer device being configured to transfer lubricant from the primary lubricant line to the plurality of planet gears.

The turbine engine of any preceding clause, the REB cage including an outer diameter (OD) guide ring to keep a rotation axis of the plurality of planet bearing rollers substantially parallel to a planet gear longitudinal centerline axis.

The turbine engine of any preceding clause, the REB cage being configured to keep the plurality of planet bearing rollers spaced apart in a longitudinal direction along the planet gear longitudinal centerline axis.

The turbine engine of any preceding clause, the REB cage comprising a cylindrical body, the cylindrical body having a plurality of pocket openings defined within and positioned circumferentially about the cylindrical body.

The turbine engine of any preceding clause, the plurality of pocket openings being positioned circumferentially relative to a centerline of the cylindrical body.

The turbine engine of any preceding clause, the REB cage further including a pair of circumferential side rails and a plurality of cross rails extending between the pair of circumferential side rails, such that the plurality of pocket openings are defined therebetween.

The turbine engine of any preceding clause, at least a portion of the cylindrical body being hollow to reduce a mass of the REB cage.

Although the foregoing description is directed to the preferred embodiments of the present disclosure, other variations and modifications will be apparent to those skilled in the art and may be made without departing from the disclosure. Moreover, features described in connection with one embodiment of the present disclosure may be used in conjunction with other embodiments, even if not explicitly stated above.

The invention claimed is:

1. A gearbox assembly for a turbine engine, the gearbox assembly comprising:

a plurality of planet gears, each of the plurality of planet gears being associated with a planet pin;

a plurality of planet bearing rollers disposed between the planet pin and each of the plurality of planet gears, the plurality of planet bearing rollers configured to transfer a rotation of each of the plurality of planet gears to the planet pin;

a rolling element bearing (REB) cage configured to guide and to position the plurality of planet bearing rollers so that the plurality of planet bearing rollers are equally spaced apart, the REB cage having an inner diameter surface facing the planet pin and an outer diameter surface facing opposite to the planet pin;

an outer diameter guide ring disposed radially outward of the outer diameter surface to hold the REB cage in place relative to a planet gear longitudinal centerline axis of the plurality of planet gears; and an integral outer ring integral to the planet pin, the integral outer ring configured to support the inner diameter surface of the REB cage, wherein, during a rotation of the plurality of planet gears, a load on the REB cage is split between the inner diameter surface and the outer diameter surface of the REB cage.

2. The gearbox assembly of claim 1, wherein the plurality of planet bearing rollers are configured to support a rotation of each of the plurality of planet gears.

3. The gearbox assembly of claim 1, wherein the REB cage is configured to align a rotation axis of the plurality of planet bearing rollers relative to each other.

4. The gearbox assembly of claim 1, wherein the REB cage is a monolithic part having a plurality of pocket openings configured to receive the plurality of planet bearing rollers to provide spacing for the plurality of planet bearing rollers around a circumference of the plurality of planet bearing rollers.

5. The gearbox assembly of claim 1, wherein a lubricant film is provided between the inner diameter surface of the REB cage and the planet pin to create a journal bearing for the REB cage to allow the REB cage to rotate with less friction.

6. The gearbox assembly of claim 1, wherein a lubricant film is provided between the outer diameter surface of the REB cage and the outer diameter guide ring to create a journal bearing for the REB cage to allow the REB cage to rotate with less friction.

7. The gearbox assembly of claim 1, wherein the outer diameter guide ring includes a lubricant conduit, the lubricant conduit being configured to guide lubricant between the outer diameter surface of the REB cage and the outer diameter guide ring.

8. The gearbox assembly of claim 1, further comprising an integral inner guide ring that is provided between two contiguous REB cages, the integral inner guide ring configured to support the inner diameter surface and the outer diameter surface of the two contiguous REB cages.

9. The gearbox assembly of claim 1, wherein the REB cage includes a cylindrical body and a reinforcement structure extending within a portion of the cylindrical body.

10. The gearbox assembly of claim 9, wherein the reinforcement structure includes one or more rib members, a honeycomb structure extending withing hollow portions of the cylindrical body, or a filler material configured to fill a hollow cavity of the cylindrical body, or any combination thereof.

11. The gearbox assembly of claim 1, further comprising a carrier adapter plate, wherein the planet pin is connected to an output shaft via the carrier adapter plate.

12. The gearbox assembly of claim 11, wherein the carrier adapter plate is coupled to the planet pin via an inner race such that the inner race is coupled to the carrier adapter plate.

13. The gearbox assembly of claim 1, further comprising a lubricant delivery system, the lubricant delivery system configured to provide lubricant to the plurality of planet bearing rollers.

14. The gearbox assembly of claim 13, wherein the lubricant delivery system is connected to a primary lubricant line that is coupled to a lubricant transfer device, the lubricant transfer device configured to transfer lubricant from the primary lubricant line to the plurality of planet gears.

15. The gearbox assembly of claim 1, wherein the REB cage and the outer diameter guide ring are configured to keep a rotation axis of the plurality of planet bearing rollers substantially parallel to a planet gear longitudinal centerline axis.

16. The gearbox assembly of claim 15, wherein the REB cage is configured to keep the plurality of planet bearing rollers spaced apart in a longitudinal direction along the planet gear longitudinal centerline axis.

17. The gearbox assembly of claim 1, wherein the REB cage comprises a cylindrical body, the cylindrical body having a plurality of pocket openings defined within and positioned circumferentially about the cylindrical body.

18. The gearbox assembly of claim 17, wherein the plurality of pocket openings are positioned circumferentially relative to a centerline of the cylindrical body.

19. The gearbox assembly of claim 17, wherein the REB cage further includes a pair of circumferential side rails and a plurality of cross rails extending between the pair of circumferential side rails, such that the plurality of pocket openings are defined therebetween.

20. The gearbox assembly of claim 17, wherein at least a portion of the cylindrical body is hollow to reduce a mass of the REB cage.

* * * * *